US008104798B2

(12) United States Patent
Toulouse et al.

(10) Patent No.: US 8,104,798 B2
(45) Date of Patent: Jan. 31, 2012

(54) CONNECTING ADAPTER FOR A GAS CARTRIDGE AND A GAS INDUCTION DEVICE OF A GAS FASTENING APPARATUS, THE CARTRIDGE, THE SOLENOID VALVE AND THE APPARATUS WITH THE ADAPTER

(75) Inventors: Bruno Toulouse, Tain-I'Hermitage (FR); Patrick Herelier, Saint Jean de Muzols (FR); Frederic Nayrac, Bourg les Valence (FR)

(73) Assignee: Illinois Tool Works, Inc., Glenview, IL (US)

( * ) Notice: Subject to any disclaimer, the term of this patent is extended or adjusted under 35 U.S.C. 154(b) by 907 days.

(21) Appl. No.: 11/569,565

(22) PCT Filed: May 24, 2005

(86) PCT No.: PCT/IB2005/001415

§ 371 (c)(1),
(2), (4) Date: Nov. 22, 2006

(87) PCT Pub. No.: WO2005/116508

PCT Pub. Date: Dec. 8, 2005

(65) Prior Publication Data

US 2007/0251376 A1 Nov. 1, 2007

(30) Foreign Application Priority Data

May 25, 2004 (FR) .................................... 04 05605
Jun. 30, 2004 (FR) .................................... 04 07208

(51) Int. Cl.
*F16L 21/02* (2006.01)
*F16L 21/03* (2006.01)
*F16L 17/03* (2006.01)
*F16L 17/035* (2006.01)

(52) U.S. Cl. ......... 285/369; 285/345; 277/608; 277/612

(58) Field of Classification Search .................. 285/369, 285/370, 345, 307; 277/608, 609, 612, 641, 277/644; 123/46 SC
See application file for complete search history.

(56) References Cited

U.S. PATENT DOCUMENTS 1,213,518 A * 1/1917 McEwen ....................... 285/307
2,329,000 A * 9/1943 Rembert ....................... 285/369
2,523,716 A * 9/1950 Parr ............................. 285/369
2,805,591 A * 9/1957 Widmer ........................ 285/369
4,657,286 A 4/1987 Guest
4,902,043 A 2/1990 Caroll
5,263,439 A * 11/1993 Doherty et al. ........... 123/46 SC
6,217,085 B1 * 4/2001 Toulouse
6,523,860 B1 * 2/2003 Shkolnikov et al.
2003/0111135 A1 * 6/2003 Vallon et al.
2004/0112309 A1 * 6/2004 Odoni et al. .............. 123/46 SC
2004/0206798 A1 * 10/2004 Robinson (Continued)

FOREIGN PATENT DOCUMENTS

CN 1347791 5/2002

(Continued)

*Primary Examiner* — James Hewitt
(74) *Attorney, Agent, or Firm* — Lowe Hauptman Ham & Berner LLP

(57) ABSTRACT

The adapter is designed to receive an outlet end (23) of the cartridge (20) and an inlet end (32) of the induction device (30), as well as a seal (11) between the two ends (23, 32). The seal (11) includes an annular transverse portion (53) intended to be interposed between the two ends (23, 32) and the material of the seal (11) is selected from the group consisting of compressible and flexible materials.

1 Claim, 1 Drawing Sheet

FOREIGN PATENT DOCUMENTS

| | | | |
|---|---|---|---|
| CN | 1426877 | | 7/2003 |
| EP | 0922902 | A1 | 6/1999 |
| EP | 1197299 | A2 | 4/2002 |
| EP | 1327501 | A | 7/2003 |
| EP | 1468788 | A1 | 10/2004 |
| FR | 2833686 | A1 | 6/2003 |

* cited by examiner

CONNECTING ADAPTER FOR A GAS CARTRIDGE AND A GAS INDUCTION DEVICE OF A GAS FASTENING APPARATUS, THE CARTRIDGE, THE SOLENOID VALVE AND THE APPARATUS WITH THE ADAPTER

RELATED APPLICATIONS

The present application is a National Phase entry of International Application Number PCT/IB2005/001415, filed May 24, 2005, which claims priority from, French Application Numbers 0405605, filed May 25, 2004 and 0407208, filed Jun. 30, 2004, the disclosures of which are hereby incorporated by reference herein in their entirety.

TECHNICAL FIELD

This invention relates to gas fastening apparatus, the gas contained in a cartridge being injected into the combustion chamber of an internal combustion engine by a gas induction device, a priori, a solenoid valve.

The invention relates more particularly to the mounting of the solenoid valve on the gas cartridge.

BACKGROUND

Both EP 98402916.5 and EP 01402614.0 provide for the mounting of the solenoid valve on the cartridge by means of an adapter. The adapter is designed to receive the two ends of the cartridge and of the solenoid valve, to both of which pressure has to be applied in order to allow for the transfer of gas from the cartridge to the solenoid valve, as well as a seal between the two.

Problems of two kinds may arise with either of the arrangements of the two documents mentioned hereinabove.

The seal may expand and become jammed on the outlet end of the cartridge. In this case, if the cartridge is removed when it is not yet empty, the gas will escape. It will be noted that, when the cartridge is not empty, it is quite easy to remove the cartridge by virtue of the temporary escape of the gas, which ejects it from its housing.

However, when the cartridge is empty, it may be difficult to grip it by its base and remove it from its housing.

Adapting the solenoid valve to a gas cartridge moreover involves a lot of components. Even if the dimensions of each of these components comply with the high tolerance limits, taken as a whole, problems may arise with mounting. Thus, if an annular groove is provided on the cartridge adapter, intended to receive locking means, as instructed by EP 01402614.0, correct mounting of the cartridge in its housing with locking of the adapter may be rendered impossible, with the cartridge not being held in its housing.

Conversely, the cartridge may be placed in its housing, but the series of dimensions is such that it is impossible to slide the end of the cartridge sufficiently for the gas to escape as the impact stroke is insufficient.

SUMMARY

The aim of this invention is to solve these problems.

The invention therefore relates to a connecting adapter designed to be mounted on a gas cartridge and on the gas induction device of a gas fastening apparatus and to receive, on the one hand, an outlet end of the cartridge and an inlet end of the induction device and, on the other hand, a seal between the two ends, characterised in that the seal includes an annular transverse portion intended to be interposed between the two ends and the material of the seal is selected from the group consisting of compressible and flexible materials.

When the cartridge is to be removed from its housing, even if it is empty, the resilience of the material of the transverse portion of the seal begins the ejection of the cartridge. In any event, irrespective of whether it is a compressible or flexible material, the nature of the material of the seal makes it possible to compensate for dimensional errors and to always allow the cartridge to be mounted in the apparatus and to ensure the impact stroke of the outlet end of the cartridge and therefore the transfer of the gas from the cartridge to the induction device of the fastening apparatus.

Expanded polystyrene is a possible compressible material. An elastomer material is a very suitable flexible material.

In order to prevent the seal from becoming jammed in the adapter as a result of deformation and keeping the end of the cartridge in the discharge position, in the preferred embodiment of the adapter of the invention, the seal is disposed in a sleeve of rigid material for maintaining the shape of the seal, advantageously mounted to move in the adapter.

This application of course also relates to any gas fastening apparatus provided with the adapter and to any gas cartridge or any gas induction device of a gas fastening apparatus provided with the adapter.

BRIEF DESCRIPTION OF THE DRAWINGS

The invention will be more readily understood with the aid of the following description of an assembly consisting of a solenoid valve and a gas cartridge with the adapter of the invention, with reference to the accompanying drawings, in which.

DETAILED DESCRIPTION

Figure 1:
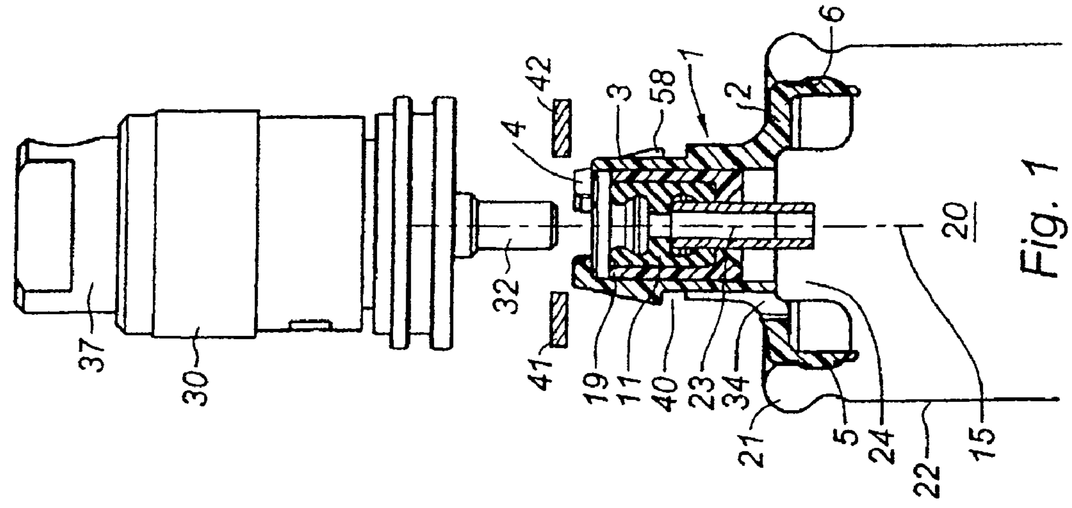
FIG. 1 is a view of the solenoid valve and of the cartridge provided with the adapter shown in axial section, before it is mounted on the solenoid valve.
Figure 2:
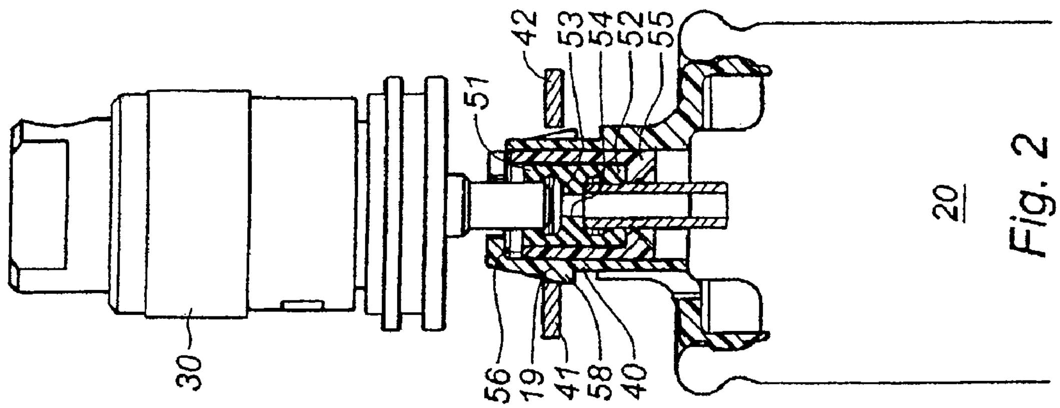
FIG. 2 is a view similar to that of FIG. 1, during mounting on the solenoid valve.

A fastening apparatus for fastening elements having a piston driven by compressed gas comprises an internal combustion engine comprising a combustion chamber intended to be supplied with compressed gas from a gas cartridge 20 in order to drive the piston for driving fastening elements.

In the particular example of the description, the connecting adapter is intended to connect a solenoid valve 30 for the admission of the compressed gas into the combustion chamber of the fastening apparatus and the compressed gas cartridge 20.

The cartridge 20 of generally cylindrical shape is provided in an internal casing with the compressed gas in the liquid state and between the internal casing and an external casing 22 with a propellant. A circular edge 21 forms a continuation of the external cylindrical wall of the cartridge 20 at one of the ends of the latter. A male outlet end 23 connected to the internal casing projects from the cartridge by means of a base 24 situated in the centre of the circle described by the edge 21.

The solenoid valve 30 of generally cylindrical shape is provided at one of its ends with an inlet end 32 connected in the interior of the solenoid valve to an outlet end (not shown) projecting from a head 37 at the other end of the solenoid valve.

The inlet end 32 is in this case a male end.

The adapter 1 is a seal holder intended to receive the male outlet end 23 of the cartridge 20 and the male inlet end 32 of the solenoid valve 30. The adapter 1, made in one piece from plastic, includes a plane supporting base 2, in this case circular, supporting the chamber 3 for housing a seal 11 and a sleeve 19, open at both ends and extending along an axis 15 perpendicular to the supporting base 2 on one side of the latter. The free end edge 4 of the chamber 3 is folded down at a right angle towards the interior of the chamber 3 and forms an opening for the passage of the inlet end 32 of the solenoid valve 30, having a cross section substantially equal to that of the end 32.

Fastening legs 5, 6 connected to the supporting base 2 at one of their ends and in this case symmetrical in relation to axial planes extend along parallel planes perpendicular to the supporting base 2 on the side opposite that of the chamber 3. The spacing of the legs 5. 6 is substantially equal to the internal diameter of the edge 21 of the fuel cartridge 20. The legs 5, 6 are moreover each provided at their free ends with a boss intended to engage with the internal wall of the edge 21.

The chamber 3 of the adapter 1 is provided on its exterior close to the edge 4 with a plurality of ramps £8 and close to the supporting base 2 with a plurality of ribs 34. The ramps £& and the ribs 34 form between them an annular hooking groove 40 for a locking mechanism with hooks 41, 42, as instructed by the document EP 01402614.0.

The seal 11 has a generally tubular shape with annular sealing lips 51, 52 at both ends. It includes an annular transverse portion 53 forming a passage 54 and giving the seal an H-shaped axial section. The seal 11 is in this case made of a relatively flexible elastomer material.

The seal 11 is mounted in the interior of the rigid sleeve 19. It is also a tubular component provided on the side of the cartridge 20 with an internal annular retaining flange 55 for the seal 11. The external diameter of the sleeve 19 is substantially equal to the internal diameter of the chamber 3 of the adapter. Its internal diameter is substantially equal to the external diameter of the seal 11. The internal axial length of the sleeve 19 between its edge 56 and its flange 55 is substantially equal to the axial length of the seal 11. Its external axial length is smaller than that of the chamber 3 so that it can slide freely inside the chamber.

The connection between the inlet end 32 of the solenoid valve 30 and the outlet end 23 of the gas cartridge 20 will now be described.

In order to mount the adapter on the cartridge 20, the fastening legs 5, 6 are inserted into the edge 21 of the cartridge 20. The bosses of the legs 5, 6 are hooked and clipped on to the internal wall of the edge 21. When the adapter is fastened to the cartridge 20, the outlet end 23 of the cartridge 20 is guided by the bevelled flange 55 of the sleeve 19 into the seal 11 on one side of the transverse portion 53.

The adapter 1 is then slid over the male inlet end 32 of the solenoid valve, guided by the edge 4, the end engaging in the seal 11 on the other side of the transverse portion 53.

The adapter 1 is finally mounted on the cartridge 20 and on the solenoid valve 30 by relative translational movements of the three elements.

Figure 3:
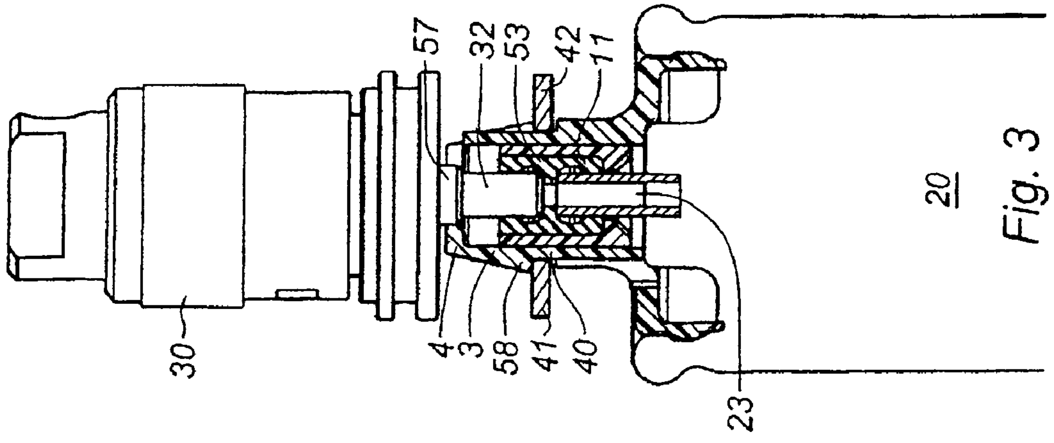
FIG. 3 is a view similar to those of FIGS. 1 and 2, after mounting on the solenoid valve.

When the adapter engages with the inlet end 32 of the solenoid valve 30, the ramps 58 pass the locking hooks 41 , 42 which are received in the groove 40 irrespective of the tolerance errors, as the latter can be compensated for by the spring action of the transverse portion 53 of the seal 11 which can thus be compressed as a result of its elasticity, as shown in FIG. 3. Once the ramps 58 of the adapter have passed the locking hooks 41 , 42, the two ends 23, 32 are perfectly engaged in the seal 11 in the pushed-back discharge and intake positions, bearing against the transverse portion 53, the edge 4 of the chamber 3 of the adapter being engaged on a bottom sleeve 57 of the inlet end 32 having an enlarged diameter.

Once the cartridge 20 has been used and is empty, the resilience of the transverse portion 53 of the seal 11 triggers its removal from the housing of the apparatus.

If, for some reason, it is desired to remove it from its housing before it is empty, although the sealing force of the scaling lips 51, 52 is high, the seal 11 will remain held in the adapter 1 by the sleeve 19 and the outlet end 23 will resume its closing position prior to mounting;

The seal 11 is mounted within the sleeve 19. It could be interesting to mounting it therein to form an assembly in one piece. Securing one to the other could be achieved by gluing, welding, ultra-sounds, biomaterial injection, moulding, etc.

The invention claimed is:

1. A connecting adapter for sealingly receiving and connecting an outlet end of a gas cartridge and an inlet end of a gas induction device of a gas fastening apparatus, said adapter comprising:

a sleeve of rigid material;

a seal of a flexible and compressible material for sealing a connection between the outlet end of the gas cartridge and the inlet end of the gas induction device, said seal being disposed in the sleeve; and an adapter body defining a chamber for housing the sleeve and the seal;

wherein the sleeve is moveable within the chamber in an axial direction of the chamber in which the outlet end of the gas cartridge and the inlet end of the gas induction device are to be inserted into the adapter;

wherein the seal comprises an annular transverse portion adapted to be interposed between and compressed, in the axial direction, by the outlet end of the gas cartridge and the inlet end of the gas induction device;

wherein said seal further comprises annular sealing lips each for sealingly contacting one of the inlet end and outlet end, respectively; and said annular transverse portion is positioned, in the axial direction, between said annular sealing lips and projects radially inwardly farther than one of said annular sealing lips.

* * * * *